(12) United States Patent
Lee

(10) Patent No.: US 9,736,468 B2
(45) Date of Patent: Aug. 15, 2017

(54) CALIBRATION METHOD OF AN IMAGE CAPTURE SYSTEM

(71) Applicant: Etron Technology, Inc., Hsinchu (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 29 days.

(21) Appl. No.: 14/615,431

(22) Filed: Feb. 6, 2015

(65) Prior Publication Data
US 2015/0237344 A1 Aug. 20, 2015

(30) Foreign Application Priority Data

Feb. 19, 2014 (TW) .............................. 103105549 A

(51) Int. Cl.
*H04N 17/00* (2006.01)
*H04N 17/02* (2006.01)

(52) U.S. Cl.
CPC ................................ *H04N 17/002* (2013.01)

(58) Field of Classification Search
CPC ...... H04N 17/00; H04N 17/002; H04N 17/02; G06T 7/0018
USPC ......................................... 348/187, 188, 180
See application file for complete search history.

(56) References Cited

U.S. PATENT DOCUMENTS

| 7,889,234 | B2* | 2/2011 | Williams | .............. | G06T 7/0018 |
| | | | | | 348/180 |
| 8,866,912 | B2* | 10/2014 | Mullis | .................. | H04N 17/002 |
| | | | | | 348/187 |
| 2011/0043668 | A1* | 2/2011 | McKinnon | ........... | H04N 5/3675 |
| | | | | | 348/246 |
| 2013/0141593 | A1* | 6/2013 | Bassi | .................... | H04N 9/3147 |
| | | | | | 348/188 |
| 2016/0080737 | A1* | 3/2016 | Tezaur | ................. | H04N 17/002 |
| | | | | | 348/188 |

FOREIGN PATENT DOCUMENTS

WO 2013004458 A1 1/2013

\* cited by examiner

*Primary Examiner* — Trang U Tran
(74) *Attorney, Agent, or Firm* — Winston Hsu

(57) ABSTRACT

A calibration method of an image capture system includes an image capture device of at least one image capture device capturing an image including a plurality of intersection coordinates among a plurality of geometric blocks of a test pattern and an information of a color of each geometric block of the plurality of geometric blocks; an operation unit executing a first operation on the plurality of intersection coordinates within the image to generate a plurality of geometric calibration parameters; the operation unit executing a second operation on an information of a color of each geometric block of the plurality of geometric blocks within the image to generate a plurality of color calibration parameters; and a calibration unit calibrating the image capture device according to the plurality of geometric calibration parameters and the plurality of color calibration parameters.

8 Claims, 17 Drawing Sheets

Purple color   Gray color 
Pink color   Red color 
Blue color   Orange color 
Green color   Yellow color 
White color

| Purple color |  | Gray color |  | Black color |  |
|---|---|---|---|---|---|
| Pink color |  | Red color |  | White color |  |
| Blue color |  | Orange color |  | | |
| Green color |  | Yellow color |  | | |

| | |
|---|---|
| Purple color | Gray color |
| Pink color | Red color |
| Blue color | Orange color |
| Green color | Yellow color |
| White color | |

CALIBRATION METHOD OF AN IMAGE CAPTURE SYSTEM

BACKGROUND OF THE INVENTION

1. Field of the Invention

The present invention relates to a calibration method of an image capture system, and particularly to a calibration method of an image capture system that can utilize predetermined test pattern (s) to simultaneously execute geometric calibration and color calibration, or simultaneously execute geometric calibration, color calibration, and lens shading calibration.

2. Description of the Prior Art

Generally speaking, an image capture system may have errors (e.g. geometric errors and color errors) between image capture devices of the image capture system due to assembly tolerance or manufacturing process of the image capture system. The geometric errors are usually generated by the assembly tolerance or lens characteristics of the image capture devices, and the color errors are usually generated by sensors of the image capture devices and manufacturing process of lenses of the image capture devices, wherein the geometric errors include lens deformation and shift, skew, or rotation between the image capture devices, and the color errors include color and luminance differences between the image capture devices.

When the image capture system is not calibrated, the image capture system may have some problems due to the geometric errors and the color errors. For example, when the image capture system generates a three-dimensional image, the image capture system may make a three-dimensional image sensed by eyes of a user incorrect; when the image capture system is used for generating a depth map, the image capture system may generate incorrect depth information; and when the image capture system is applied to image stitch, an image generated by the image capture system may have discontinuous image stitch and discontinuous color. In addition, the image capture system may also need multi-angle calibration.

However, when the image capture system is calibrated, the prior art needs a plurality of calibration method to calibrate the above mentioned errors. Therefore, the prior art needs to spend much cost and time when the prior art executes calibration on the image capture system.

SUMMARY OF THE INVENTION

An embodiment provides a calibration method of an image capture system, wherein the image capture system includes at least one image capture device and a calibration unit, a device applied to the calibration method includes an operation unit, a test pattern includes a plurality of geometric blocks, and each geometric block of the plurality of geometric blocks has at least two sides. The calibration method includes an image capture device of the at least one image capture device capturing an image including a plurality of intersection coordinates among the plurality of geometric blocks of the test pattern and a color information of the each geometric block of the plurality of geometric blocks of the test pattern; the operation unit executing a first operation on a plurality of intersection coordinates included in the image to generate a plurality of geometric calibration parameters; the operation unit executing a second operation on a color information of each geometric block of a plurality of geometric blocks included in the image to generate a plurality of color calibration parameters; and the calibration unit calibrating the image capture device according to the plurality of geometric calibration parameters and the plurality of color calibration parameters.

Another embodiment provides a calibration method of an image capture system, wherein the image capture system includes at least one image capture device and a calibration unit, a device applied to the calibration method includes an operation unit, each test pattern of a plurality of test patterns includes a plurality of geometric blocks, and each geometric block of the plurality of geometric blocks has at least two sides. The calibration method includes an image capture device of the at least one image capture device capturing an image including a plurality of intersection coordinates among the plurality of geometric blocks of the each test pattern and a color information of the each geometric block of the plurality of geometric blocks; the operation unit executing a first operation on a plurality of intersection coordinates among a plurality of geometric blocks included in each image of a plurality of images corresponding to the plurality of test patterns to generate a plurality of geometric calibration parameters; the operation unit executing a second operation on a color information of each geometric block of a plurality of geometric blocks included in each image of the plurality of images corresponding to the plurality of test patterns, or on a color information of each geometric block of a plurality of geometric blocks included in an image of the plurality of images corresponding to the plurality of test patterns to generate a plurality of color calibration parameters; and the calibration unit calibrating the image capture device according to the plurality of geometric calibration parameters and the plurality of color calibration parameters.

Another embodiment provides a calibration method of an image capture system, wherein the image capture system includes at least one image capture device and a calibration unit, a device applied to the calibration method includes an operation unit, a test pattern includes a plurality of geometric blocks, and each geometric block of the plurality of geometric blocks has at least two sides. The calibration method includes an image capture device of the at least one image capture device capturing a plurality of images, wherein each image of the plurality of images includes a plurality of intersection coordinates among the plurality of geometric blocks of the test pattern and a color information of the each geometric block of the plurality of geometric blocks of the test pattern and corresponds to a relative angle; the operation unit executing a first operation on a plurality of intersection coordinates among a plurality of geometric blocks included in each image of the plurality of images to generate a plurality of geometric calibration parameters; the operation unit executing a second operation on a color information of each geometric block of a plurality of geometric blocks included in each image of the plurality of images, or on a color information of each geometric block of a plurality of geometric blocks included in an image of the plurality of images to generate a plurality of color calibration parameters; and the calibration unit calibrating the image capture device according to the plurality of geometric calibration parameters and the plurality of color calibration parameters.

The present invention provides a calibration method of an image capture system. The calibration method utilizes a test pattern or test patterns provided by the present invention to simultaneously execute geometric calibration and color calibration, or simultaneously execute geometric calibration, color calibration, and lens shading calibration. In addition, the present invention generates images (including corresponding the test pattern or the test patterns) corresponding to different relative angles through a mechanical apparatus, the test patterns located on different planes, a plurality of stacked transparent display panels, or a three-dimensional display panel. Therefore, compared to the prior art, the present invention not only can save a lot of cost and time, but can also increase calibration accuracy of the image capture device because the present invention can generate more accurate calibration parameters.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
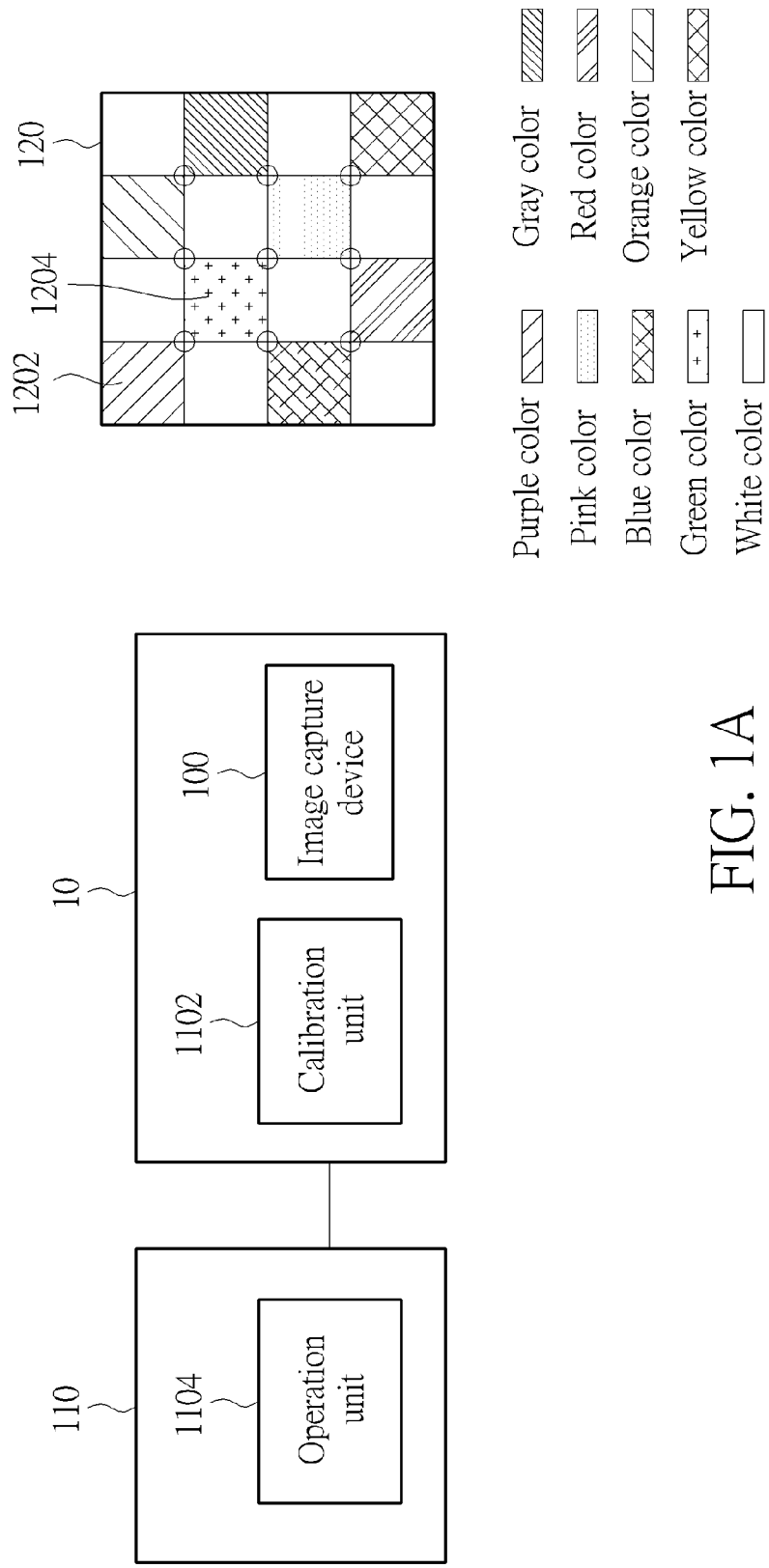
FIG. 1A is a diagram illustrating an image capture device and a calibration unit of an image capture system, a device applied to a calibration method, and a test pattern.
Figure 1B:
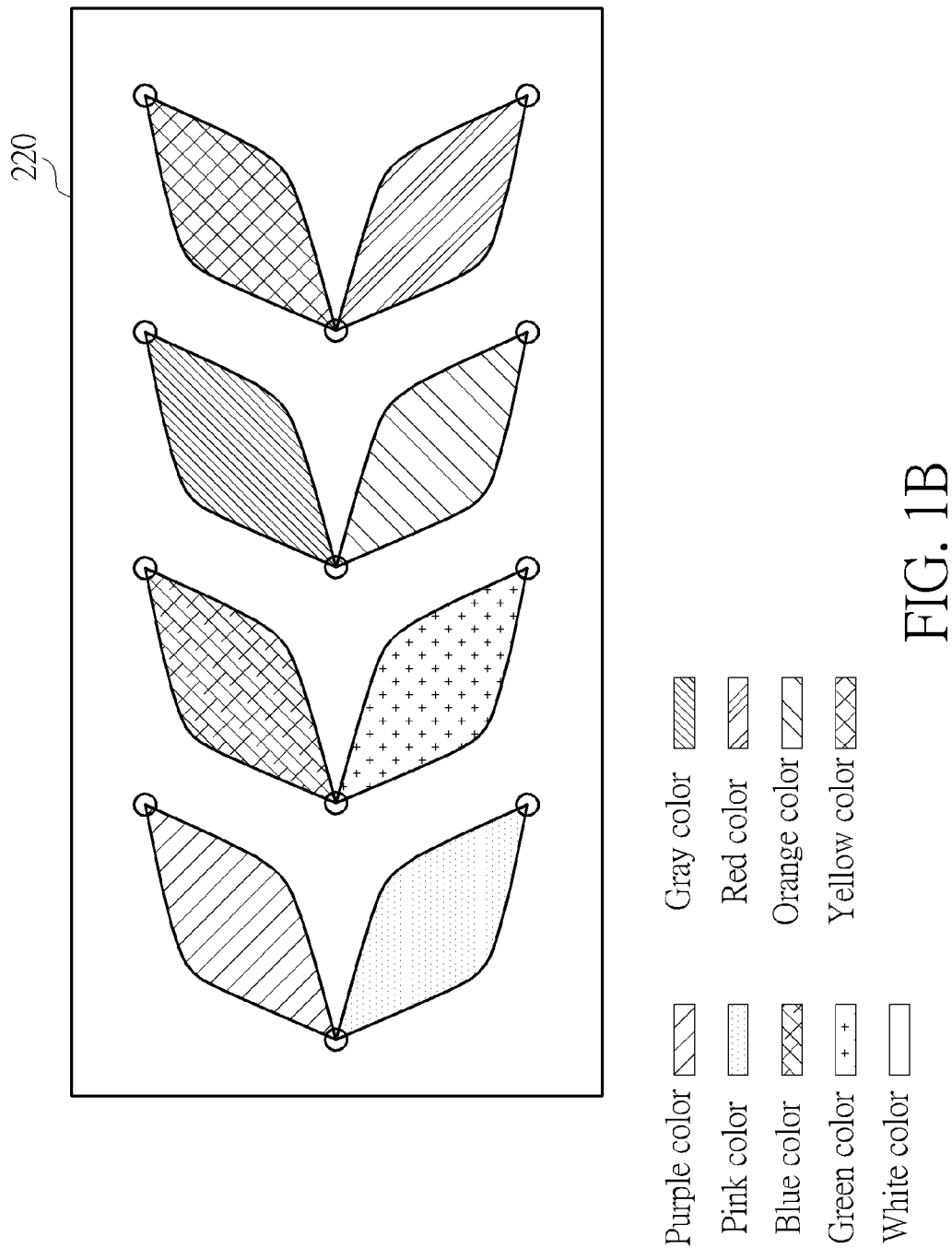
FIG. 1B is a diagram illustrating a test pattern having 8 geometric blocks with curved sides.

Please refer to FIG. 1A. FIG. 1A is a diagram illustrating an image capture device 100 and a calibration unit 1102 of an image capture system 10, a device 110 applied to a calibration method, and a test pattern 120, wherein the device 110 is coupled to the image capture system 10, the device 110 includes an operation unit 1104, the test pattern 120 includes 8 geometric blocks, and each geometric block of the 8 geometric blocks is a quadrilateral. But, the present invention is not limited to the test pattern 120 including the 8 geometric blocks and each geometric block of the 8 geometric blocks being a quadrilateral. That is to say, the test pattern 120 can include a plurality of geometric blocks and each geometric block of the 8 geometric blocks can be a geometric block having another non-quadrilateral shape. For example, a test pattern 220 having 8 geometric blocks with curved sides (as shown in FIG. 1B). As shown in FIG. 1A, a color of each geometric block of the 8 geometric blocks of the test pattern 120 is different from a color (e.g. white color) of a substrate supporting the test pattern 120 and can be used for defining a profile of each geometric block of the 8 geometric blocks of the test pattern 120, wherein a color of each geometric block of the 8 geometric blocks of the test pattern 120 is a uniform color (e.g. red color, green color, orange color, and soon), or a gradient color. In addition, each geometric block of the 8 geometric blocks of the test pattern 120 can be implemented by paper, glass, wood, light, or projected image. As shown in FIG. 1A, each endpoint of each geometric block of the 8 geometric blocks of the test pattern 120 can intersect or not intersect an endpoint of another geometric block. For example, a geometric block 1202 only has one endpoint to intersect an endpoint of a geometric block 1204. As shown in FIG. 1A, because the color of the substrate supporting the test pattern 120 is white color, colors of areas among the 8 geometric blocks of the test pattern 120 are uniform colors (that is, white color). But, the present invention is not limited to the colors of the areas among the 8 geometric blocks of the test pattern 120 being uniform colors. That is to say, the areas among the 8 geometric blocks of the test pattern 120 can also be geometric graphs with color information.

Figure 2:
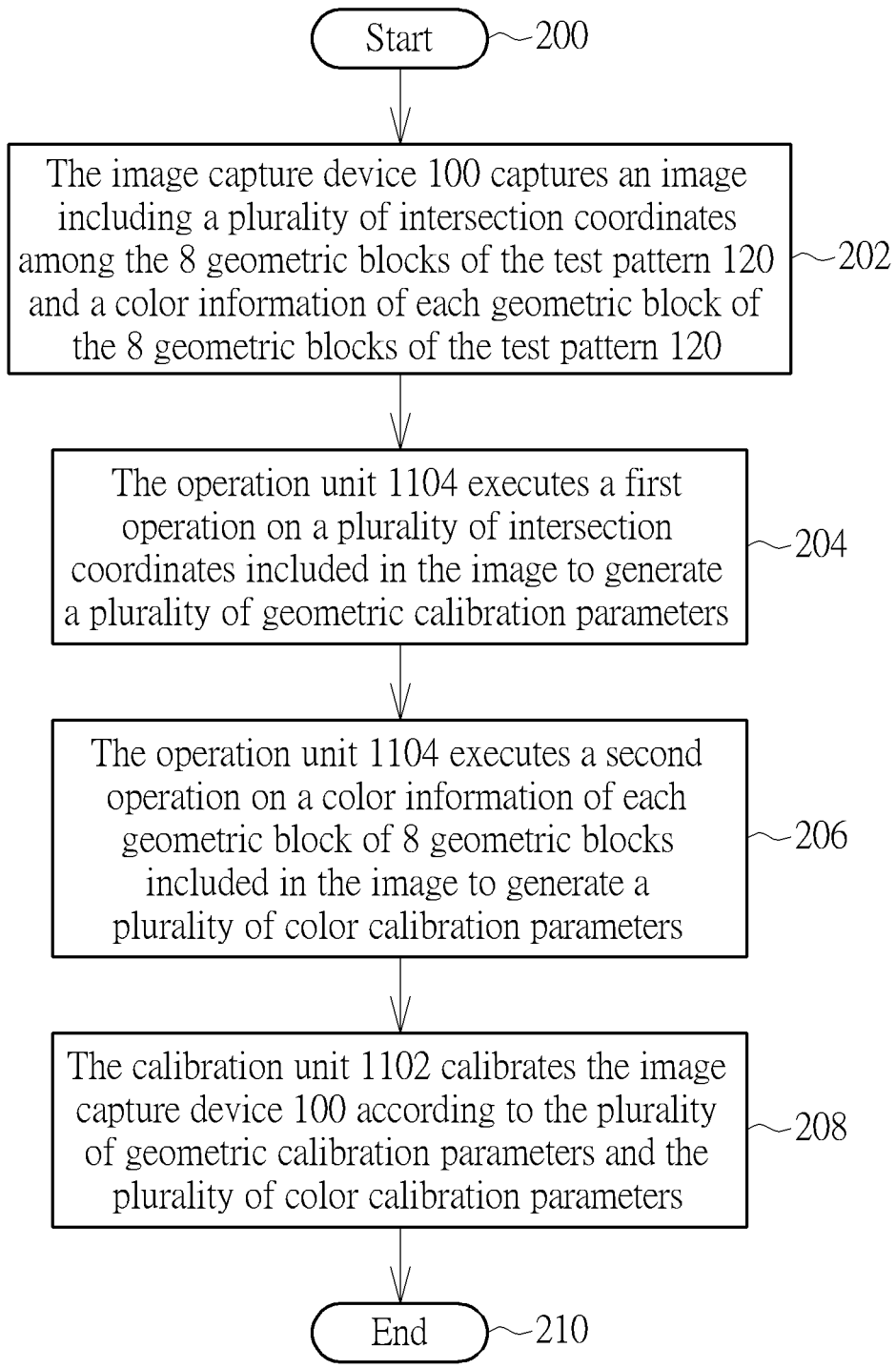
FIG. 2 is a flowchart illustrating a calibration method of an image capture system according to an embodiment.

Please refer to FIG. 2. FIG. 2 is a flowchart illustrating a calibration method of an image capture system according to an embodiment. The calibration method in FIG. 2 is illustrated using the image capture device 100, the device 110 applied to the calibration method, and the test pattern 120 in FIG. 1A. Detailed steps are as follows:

Step 200: Start.

Step 202: The image capture device 100 captures an image including a plurality of intersection coordinates among the 8 geometric blocks of the test pattern 120 and a color information of each geometric block of the 8 geometric blocks of the test pattern 120, wherein a color information of each geometric block of the 8 geometric blocks is a color information of an RGB color field, a YUV color field, a Lab color field, or an Xyz color field.

Step 204: The operation unit 1104 executes a first operation on a plurality of intersection coordinates included in the image to generate a plurality of geometric calibration parameters.

Step 206: The operation unit 1104 executes a second operation on a color information of each geometric block of 8 geometric blocks included in the image to generate a plurality of color calibration parameters.

Step 208: The calibration unit 1102 calibrates the image capture device 100 according to the plurality of geometric calibration parameters and the plurality of color calibration parameters.

Step 210: End.

Figure 3:
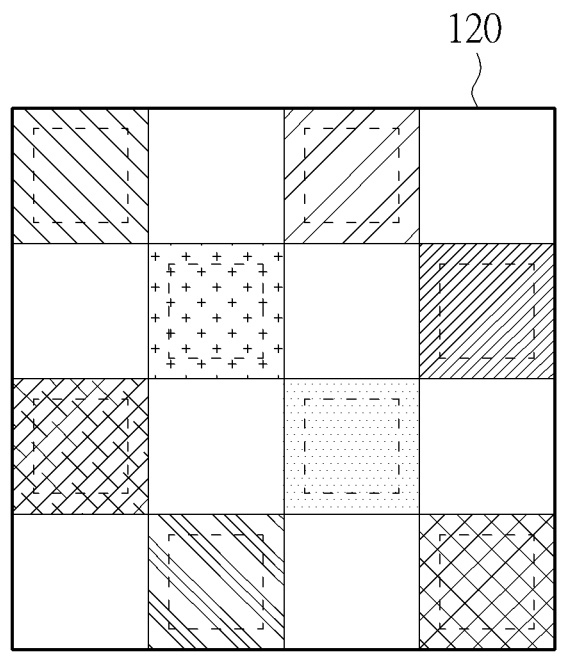
FIG. 3 is a diagram illustrating an interested area of each geometric block of the 8 geometric blocks included in the test pattern.

In Step 202, the image capture device 100 captures the image including the plurality of intersection coordinates among the 8 geometric blocks of the test pattern 120 (e.g. coordinates of 9 circles shown in FIG. 1A). In Step 204, the operation unit 1104 executes the first operation on the plurality of intersection coordinates included in the image to generate the plurality of geometric calibration parameters, wherein the first operation is a linear regression calculation. But, the present invention is not limited to the first operation being a linear regression calculation. In Step 206, the operation unit 1104 can utilizes a well-known image processing method provided by the prior art to select an interested area of each geometric block of the 8 geometric blocks included in the test pattern 120 (dotted line areas shown in FIG. 3). Then, the operation unit 1104 generates an average color value corresponding to each geometric block of the 8 geometric blocks included in the image according to an interested area of each geometric block of the 8 geometric blocks included in the image. For example, when a color information of each geometric block of the 8 geometric blocks included in the image is the color information of the RGB color field, the operation unit 1104 generates average RGB values corresponding to each geometric block of the 8 geometric blocks included in the image according to an interested area of each geometric block of the 8 geometric blocks included in the image. After the operation unit 1104 generates an average color value corresponding to each geometric block of the 8 geometric blocks included in the image, the operation unit 1104 can execute the second operation on an average color value corresponding to each geometric block of the 8 geometric blocks included in the image to generate the plurality of color calibration parameters, wherein the second operation is a linear regression calculation. But, the present invention is not limited to the second operation being a linear regression calculation. In Step 208, after the operation unit 1104 generates the plurality of geometric calibration parameters and the plurality of color calibration parameters, the calibration unit 1102 can calibrate the image capture device 100 according to the plurality of geometric calibration parameters and the plurality of color calibration parameters. In addition, a calibration method of other image capture devices included in the image capture system 10 is the same as the calibration method of the image capture device 100, so further description thereof is omitted for simplicity.

Figure 4:
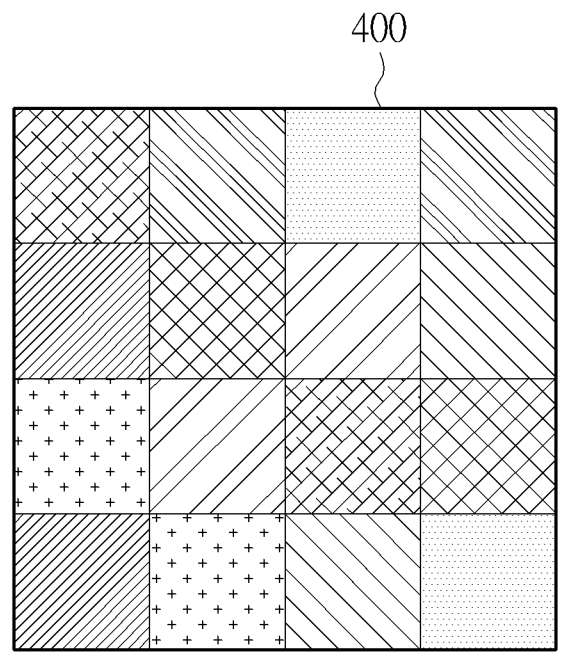
FIG. 4 to FIG. 6 are diagrams illustrating other test patterns.
Figure 5:
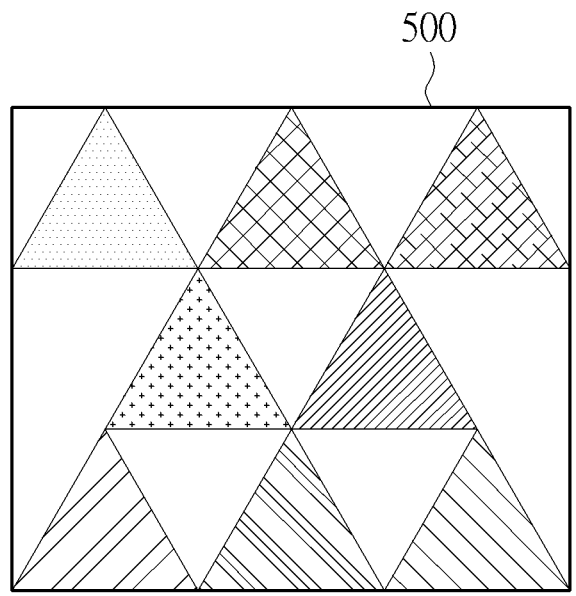
Figure 6:
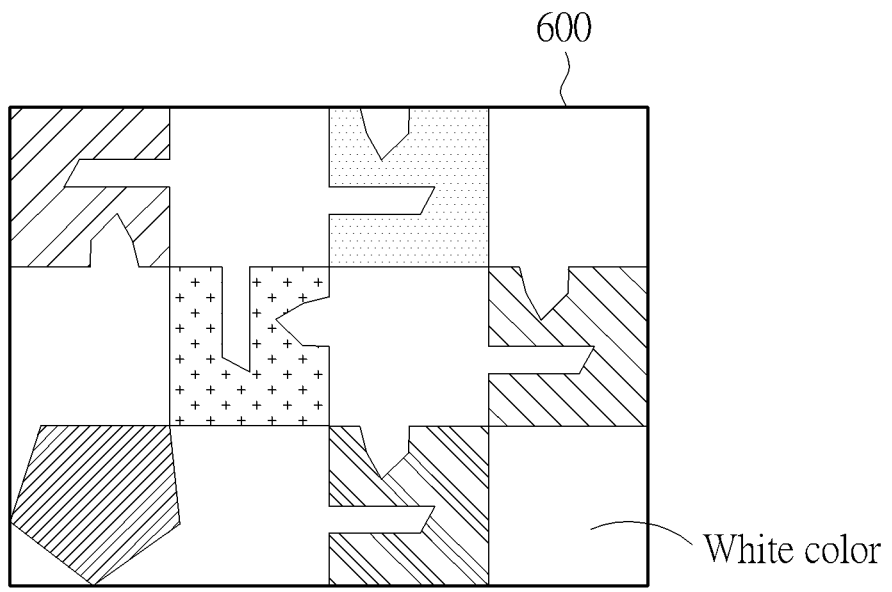
Figure 6:
Figure 6:
Figure 6:
Figure 6:
Figure 6:
Figure 6:
Figure 6:
Figure 6:
Figure 6:

Please refer to FIG. 4 to FIG. 6. FIG. 4 to FIG. 6 are diagrams illustrating other test patterns. As shown in FIG. 4, a difference between a test pattern 400 and the test pattern 120 is that the test pattern 400 does not include a color information of a substrate supporting the test pattern 400. As shown in FIG. 5, a difference between a test pattern 500 and the test pattern 120 is that each geometric block of 8 geometric blocks of the test pattern 500 is triangle. As shown in FIG. 6, a difference between a test pattern 600 and the test pattern 120 is that each geometric block of 8 geometric blocks of the test pattern 600 is polygon. But, the present invention is not limited to the test patterns shown in FIG. 1A, FIG. 1B, FIG. 4, FIG. 5, and FIG. 6. In addition, subsequent operational principles of the test patterns shown in FIG. 1B, FIG. 4, FIG. 5, and FIG. 6 are the same as those of the test pattern 120, so further description thereof is omitted for simplicity.

Figure 7:
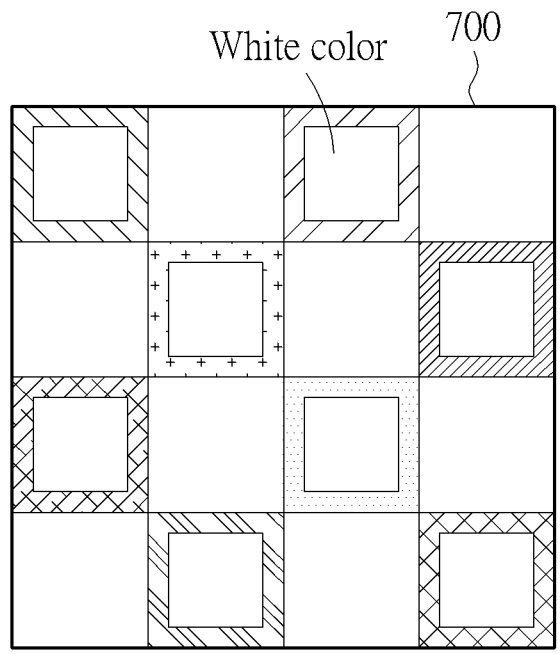
FIG. 7 is a diagram a test pattern.

Please refer to FIG. 7. FIG. 7 is a diagram illustrating a test pattern 700. As shown in FIG. 7, each geometric block of 8 geometric blocks of the test pattern 700 includes a uniform color area (rectangular areas shown in each geometric block of the 8 geometric blocks of the test pattern 700), wherein a uniform color area included in each geometric block of the 8 geometric blocks of the test pattern 700 is a part of a substrate supporting the test pattern 700, so a color of a uniform color area included in each geometric block of the 8 geometric blocks of the test pattern 700 is white color. But, the present invention is not limited to a color of a uniform color area included in each geometric block of the 8 geometric blocks of the test pattern 700 being white color, and also not limited to a uniform color area included in each geometric block of the 8 geometric blocks of the test pattern 700 being a rectangle. That is to say, a uniform color area included in each geometric block of the 8 geometric blocks of the test pattern 700 can be another shape. In addition, colors of uniform color areas included in the 8 geometric blocks of the test pattern 700 can be identical or different from each other. In addition, a color of a uniform color area included in each geometric block of the 8 geometric blocks of the test pattern 700 can be different from a color of the each geometric block of the 8 geometric blocks of the test pattern 700.

Figure 8:
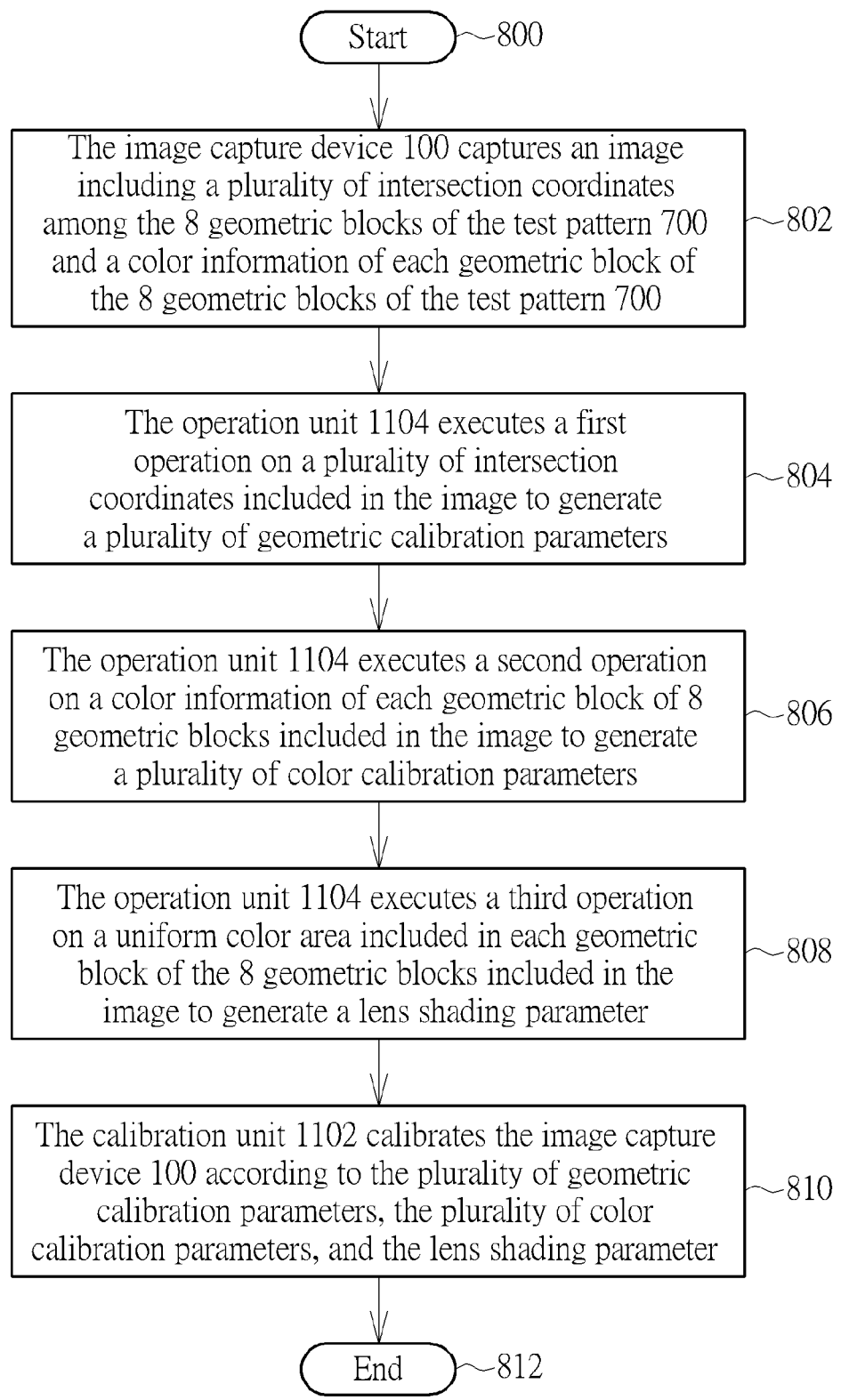
FIG. 8 is a flowchart illustrating a calibration method of an image capture system according to another embodiment.

Please refer to FIG. 8. FIG. 8 is a flowchart illustrating a calibration method of an image capture system according to another embodiment. The calibration method in FIG. 8 is illustrated using the image capture device 100, the device 110 applied to the calibration method, and the test pattern 700 in FIG. 7. Detailed steps are as follows:

Step 800: Start.

Step 802: The image capture device 100 captures an image including a plurality of intersection coordinates among the 8 geometric blocks of the test pattern 700 and a color information of each geometric block of the 8 geometric blocks of the test pattern 700.

Step 804: The operation unit 1104 executes a first operation on a plurality of intersection coordinates included in the image to generate a plurality of geometric calibration parameters.

Step 806: The operation unit 1104 executes a second operation on a color information of each geometric block of 8 geometric blocks included in the image to generate a plurality of color calibration parameters.

Step 808: The operation unit 1104 executes a third operation on a uniform color area included in each geometric block of the 8 geometric blocks included in the image to generate a lens shading parameter.

Step 810: The calibration unit 1102 calibrates the image capture device 100 according to the plurality of geometric calibration parameters, the plurality of color calibration parameters, and the lens shading parameter.

Step 812: End.

Generally speaking, color luminance corresponding to each geometric block of the 8 geometric blocks of the test pattern 700 included in the image captured by the image capture device 100 is gradually varied from center to borders of the each geometric block. Therefore, a difference between the embodiment in FIG. 8 and the embodiment in FIG. 2 is that in Step 808, the operation unit 1104 executes the third operation on a uniform color area included in each geometric block of the 8 geometric blocks included in the image captured by the image capture device 100 to generate the lens shading parameter, wherein the third operation is an operation of a compensation gain (LSC gain), and the compensation gain (LSC gain) is determined according to equation (1):

$$LSC\ gain(x,y)=LM/LR(x,y) \qquad (1)$$

As shown in equation (1), LM is a maximum luminance value of a uniform color area included in each geometric block of the 8 geometric blocks included in the image captured by the image capture device 100, or a center luminance value of a uniform color area included in each geometric block of the 8 geometric blocks included in the image, and LR(x,y) is a real luminance value of a uniform color area included in each geometric block of the 8 geometric blocks included in the image captured by the image capture device 100 corresponding to a position with coordinates (x,y). But, the present invention is not limited to the third operation being an operation of a compensation gain. That is to say, the present invention can also utilize another well-known lens shading compensation method provided by the prior art to execute the third operation. In addition, subsequent operational principles of the embodiment in FIG.

8 are the same as those of the embodiment in FIG. 2, so further description thereof is omitted for simplicity.

Figure 9:
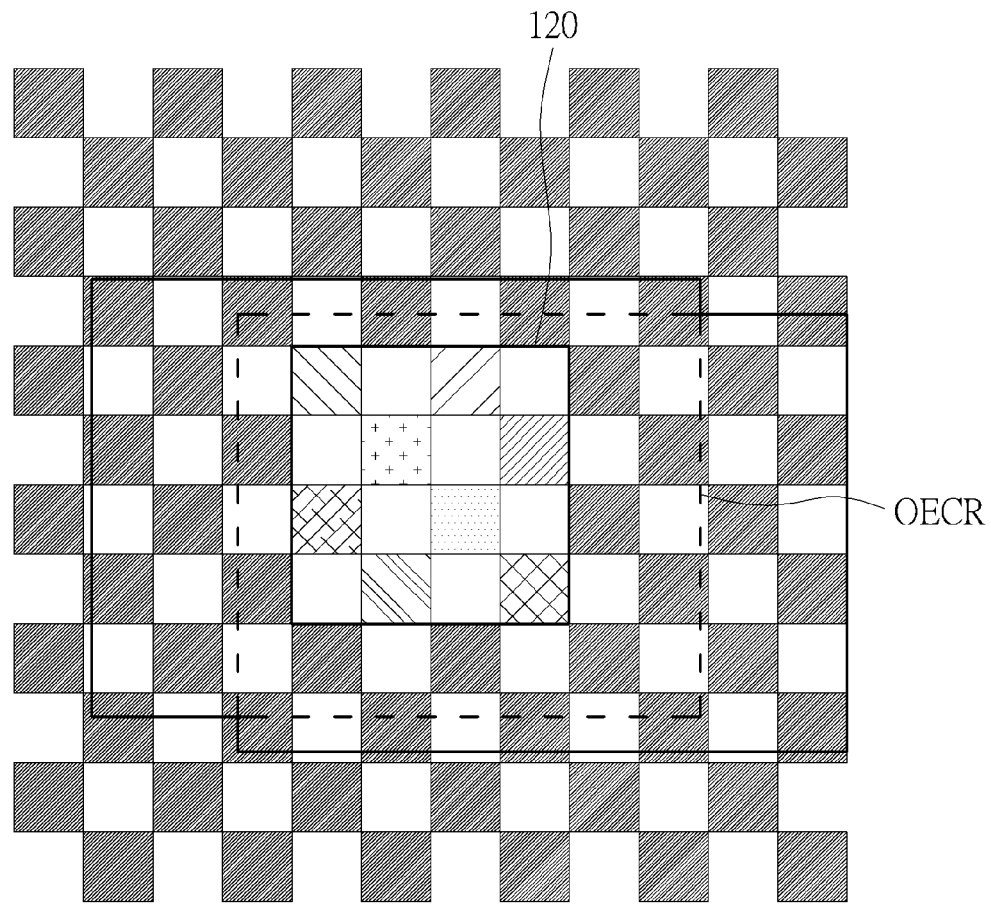
FIG. 9 is a diagram illustrating a large test pattern according to another embodiment.
Figure 9:
Figure 9:
Figure 9:
Figure 9:
Figure 9:
Figure 9:
Figure 9:
Figure 9:
Figure 9:
Figure 9:

In addition, please refer to FIG. 9. FIG. 9 is a diagram illustrating a large test pattern 900 according to another embodiment. As shown in FIG. 9, because the large test pattern 900 can provide much reference information, the large test pattern 900 can increase accuracy of color calibration and geometric calibration of an image capture system. However, because a range of the large test pattern 900 may exceed an effective capture range of each image capture device of the image capture system, an overlapped effective capture range OECR of the large test pattern 900 corresponding to each image capture device of the image capture system needs to include a test pattern (e.g. the test pattern 120 for color calibration and geometric calibration of the image capture system). In addition, as shown in FIG. 9, black geometric blocks are utilized to quickly position at parts of the large test pattern 900 outside the overlapped effective capture range OECR. But, in another embodiment of the present invention, full colors (non-black) are utilized to position one by one at parts of the large test pattern 900 outside the overlapped effective capture range OECR.

Figure 10:
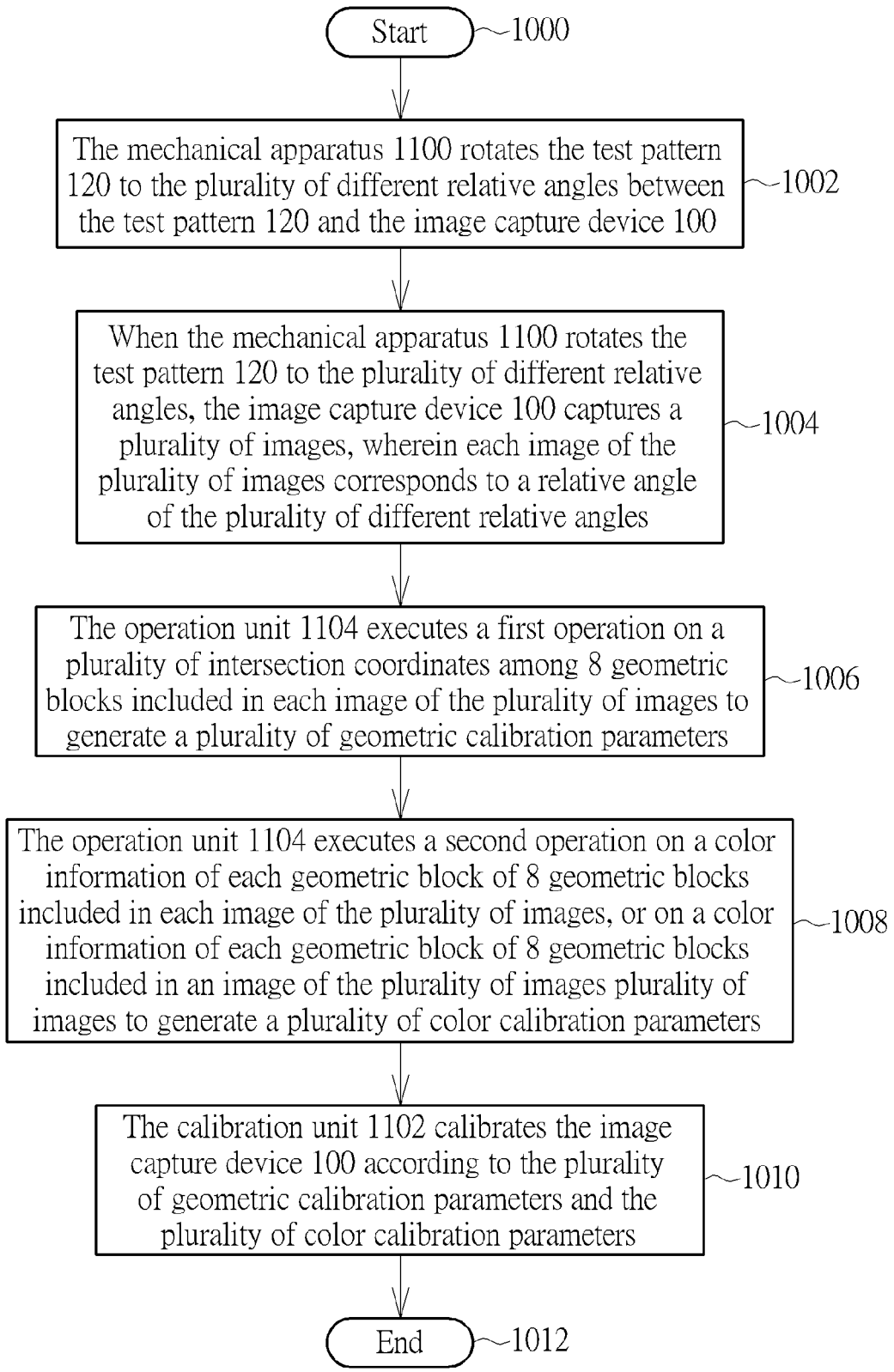
FIG. 10 is a flowchart illustrating a calibration method of an image capture system according to another embodiment.
Figure 11:
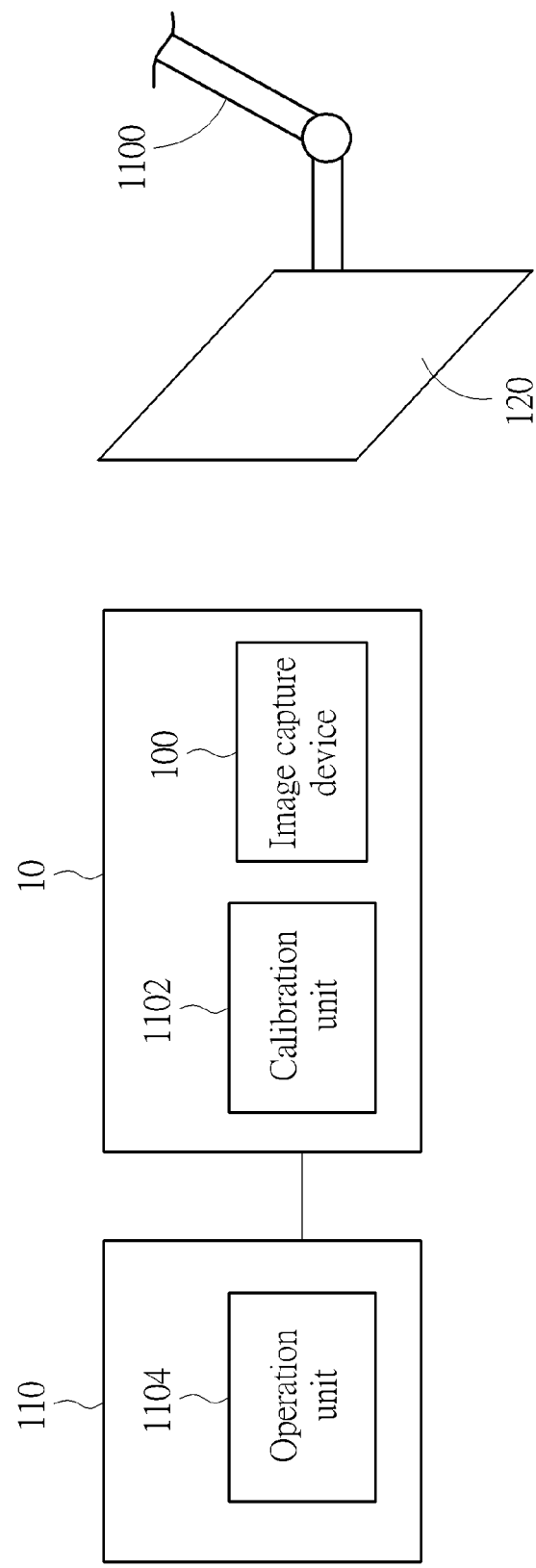
FIG. 11 is a diagram illustrating a mechanical apparatus, the image capture device, the device applied to the calibration method, and the test pattern.
Figure 12:
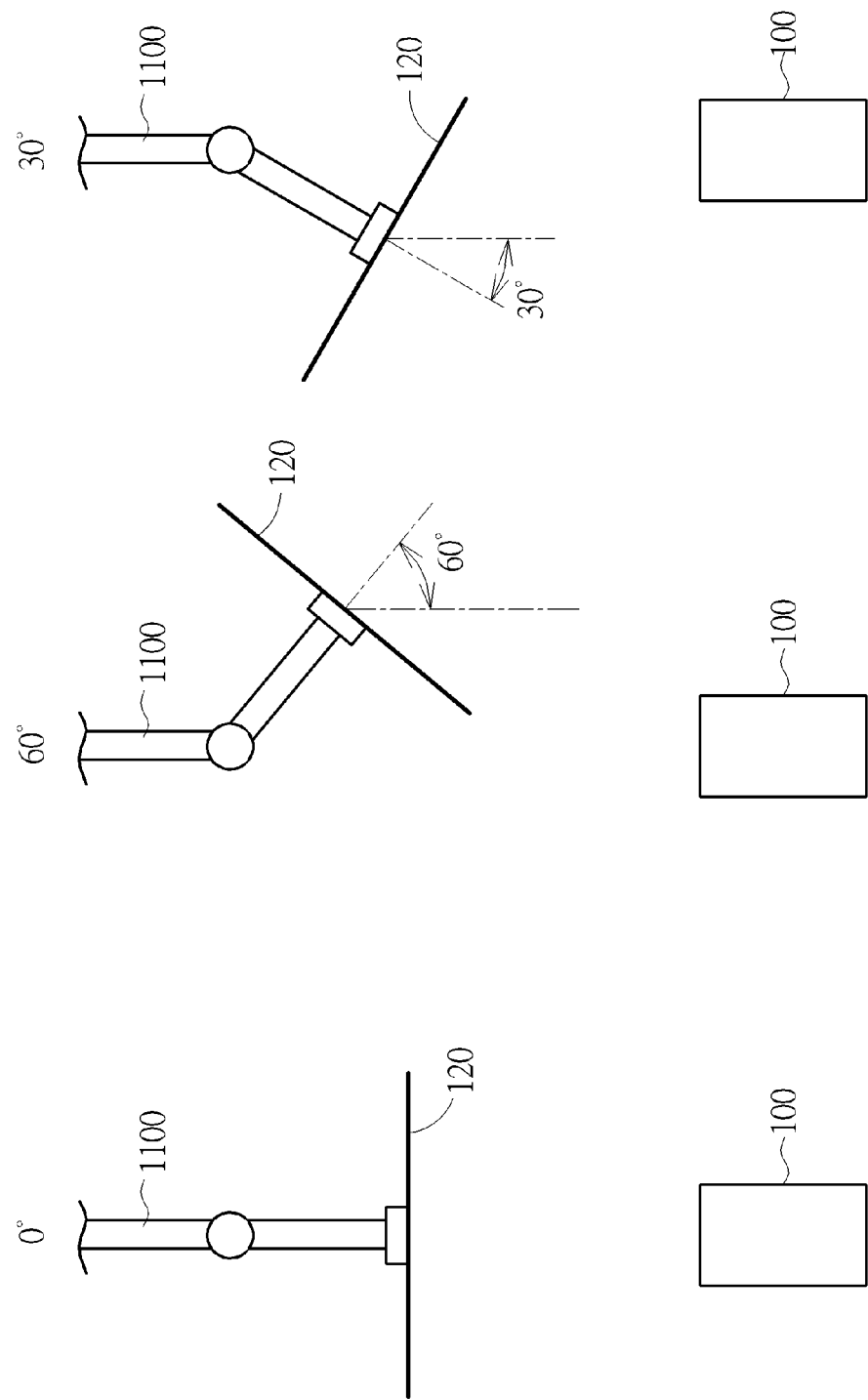
FIG. 12 is a bird's eye view illustrating the mechanical apparatus rotating the test pattern to a plurality of different relative angles between the test pattern and the image capture device.

Please refer to FIG. 10, FIG. 11, and FIG. 12. FIG. 10 is a flowchart illustrating a calibration method of an image capture system according to another embodiment, FIG. 11 is a diagram illustrating a mechanical apparatus 1100, the image capture device 100, the device 110 applied to the calibration method, and the test pattern 120, and FIG. 12 is a bird's eye view illustrating the mechanical apparatus 1100 rotating the test pattern 120 to a plurality of different relative angles between the test pattern 120 and the image capture device 100. The calibration method in FIG. 10 is illustrated using the mechanical apparatus 1100, the image capture device 100, the device 110, and the test pattern 120 in FIG. 11. Detailed steps are as follows:

Step 1000: Start.

Step 1002: The mechanical apparatus 1100 rotates the test pattern 120 to the plurality of different relative angles between the test pattern 120 and the image capture device 100.

Step 1004: When the mechanical apparatus 1100 rotates the test pattern 120 to the plurality of different relative angles, the image capture device 100 captures a plurality of images, wherein each image of the plurality of images includes the plurality of intersection coordinates among the 8 geometric blocks of the test pattern 120 and a color information of each geometric block of the 8 geometric blocks of the test pattern 120, and the each image of the plurality of images corresponds to a relative angle of the plurality of different relative angles.

Step 1006: The operation unit 1104 executes a first operation on a plurality of intersection coordinates among 8 geometric blocks included in each image of the plurality of images to generate a plurality of geometric calibration parameters.

Step 1008: The operation unit 1104 executes a second operation on a color information of each geometric block of 8 geometric blocks included in each image of the plurality of images, or on a color information of each geometric block of 8 geometric blocks included in an image of the plurality of images plurality of images to generate a plurality of color calibration parameters.

Step 1010: The calibration unit 1102 calibrates the image capture device 100 according to the plurality of geometric calibration parameters and the plurality of color calibration parameters.

Step 1012: End.

A difference between the embodiment in FIG. 10 and the embodiment in FIG. 2 is that in Step 1002, the mechanical apparatus 1100 rotates the test pattern 120 to the plurality of different relative angles and a plurality of different distances between the test pattern 120 and the image capture device 100. In addition, in another embodiment of the present invention, the mechanical apparatus 1100 rotates and moves the test pattern 120 to the plurality of different relative angles and the plurality of different distances between the test pattern 120 and the image capture device 100. As shown in FIG. 12, the mechanical apparatus 1100 rotates the test pattern 120 to a relative angle 0° between the test pattern 120 and the image capture device 100; the mechanical apparatus 1100 rotates the test pattern 120 to a relative angle 60° between the test pattern 120 and the image capture device 100; and the mechanical apparatus 1100 rotates the test pattern 120 to a relative angle 30° between the test pattern 120 and the image capture device 100. But, the present invention is not limited to the mechanical apparatus 1100 rotating the test pattern 120 to the above mentioned relative angles (0°, 30°, and 60°). In Step 1004, when the mechanical apparatus 1100 rotates the test pattern 120 to the relative angle 0°, the image capture device 100 captures an image corresponding to the relative angle 0° including the plurality of intersection coordinates among the 8 geometric blocks of the test pattern 120 and a color information of each geometric block of the 8 geometric blocks of the test pattern 120; when the mechanical apparatus 1100 rotates the test pattern 120 to the relative angle 60°, the image capture device 100 captures an image corresponding to the relative angle 60° including the plurality of intersection coordinates among the 8 geometric blocks of the test pattern 120 and a color information of each geometric block of the 8 geometric blocks of the test pattern 120; and when the mechanical apparatus 1100 rotates the test pattern 120 to the relative angle 30°, the image capture device 100 captures an image corresponding to the relative angle 30° including the plurality of intersection coordinates among the 8 geometric blocks of the test pattern 120 and a color information of each geometric block of the 8 geometric blocks of the test pattern 120. Thus, as shown in FIG. 12, because the mechanical apparatus 1100 can rotate the test pattern 120 to generate three image (wherein each image of the three images corresponds to a relative angle), in Step 1006, the operation unit 1104 can generate much location information or color information to get more accurate geometric calibration parameters and color calibration parameters according to the three images. Therefore, in Step 1010, the calibration unit 1102 can calibrate the image capture device 100 according to the more accurate geometric calibration parameters and color calibration parameters to increase accuracy of geometric calibration and color calibration of the image capture device 100. In addition, subsequent operational principles of the embodiment in FIG. 10 are the same as those of the embodiment in FIG. 2, so further description thereof is omitted for simplicity.

Figure 13:
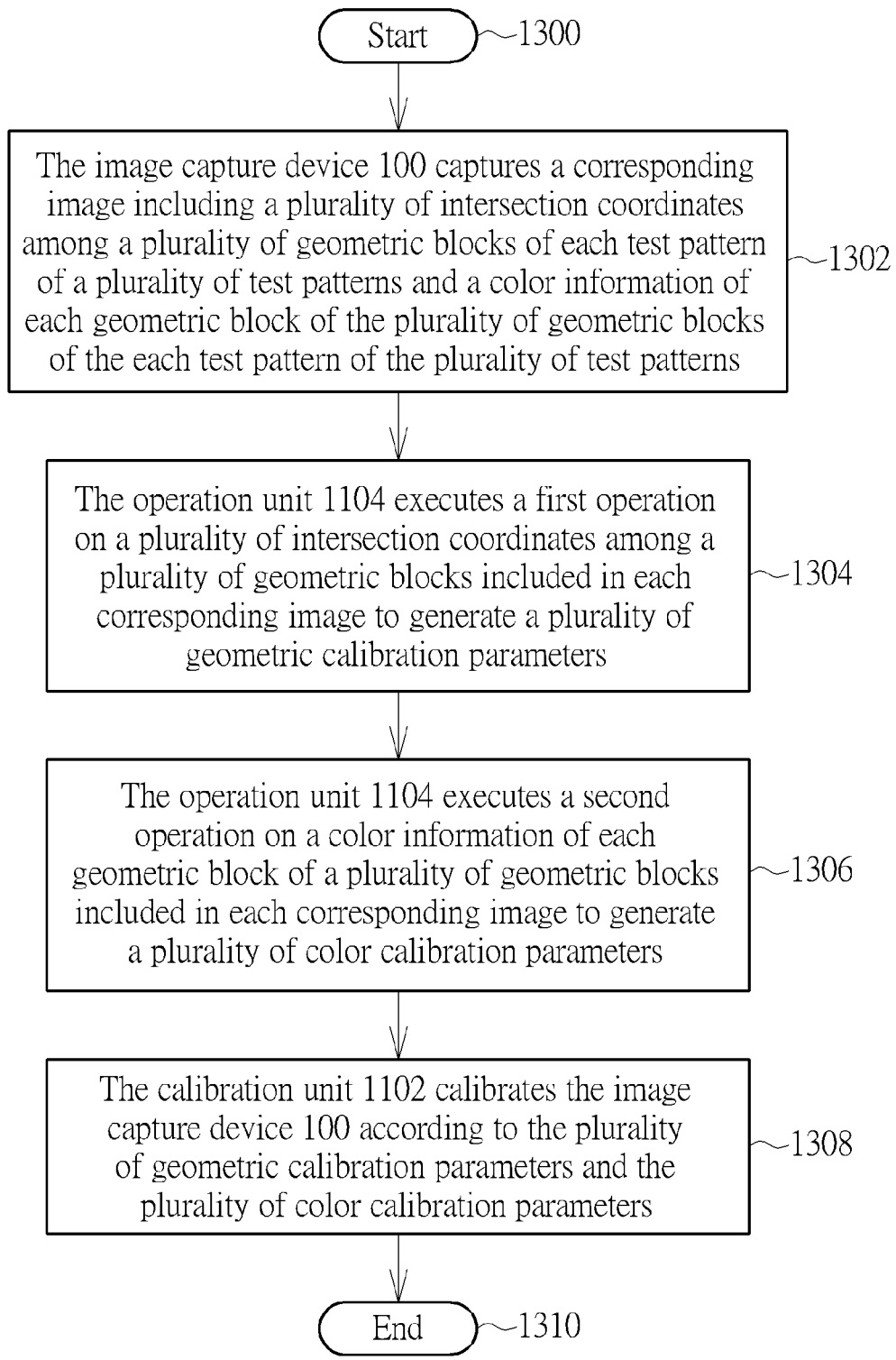
FIG. 13 is a flowchart illustrating a calibration method of an image capture system according to another embodiment.
Figure 14:
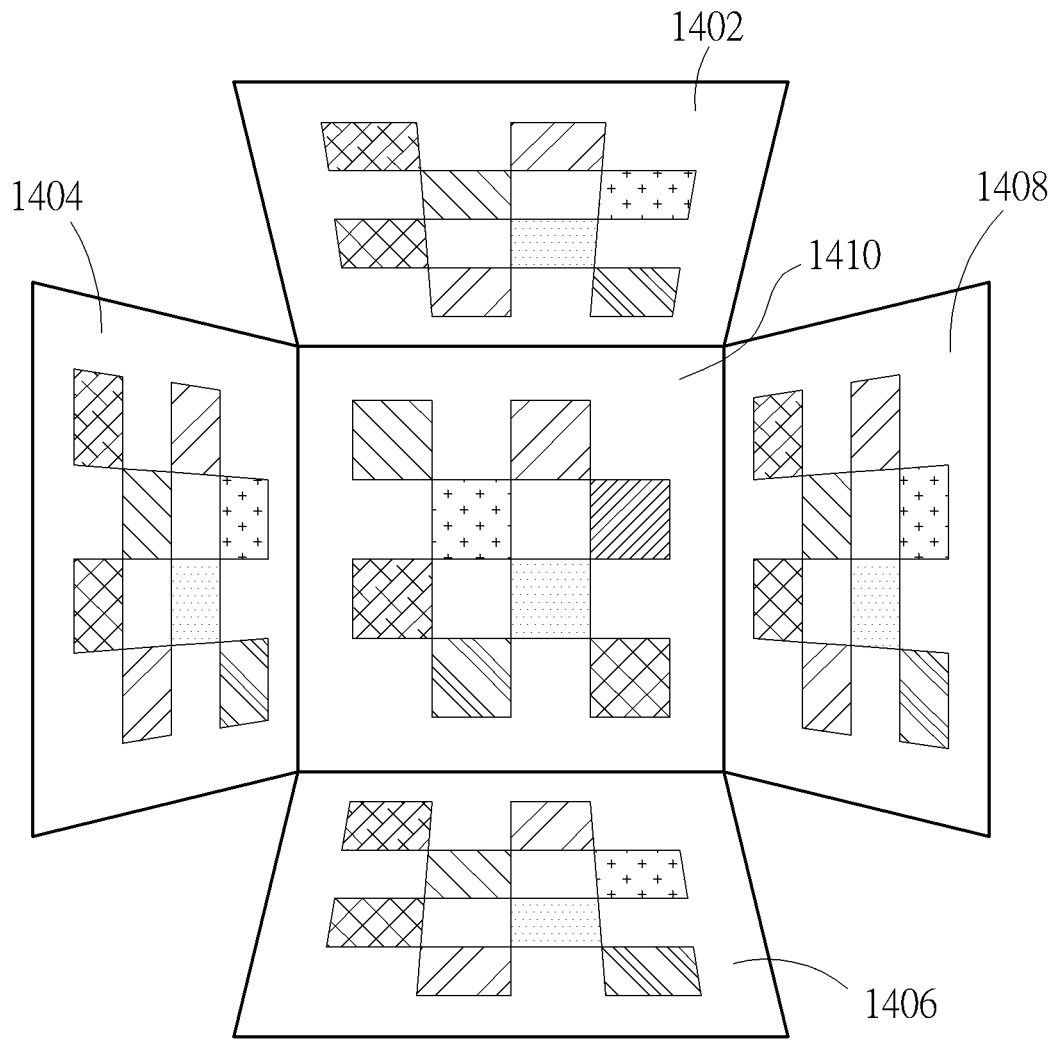
FIG. 14 is a diagram illustrating 5 test patterns.
Figure 15:
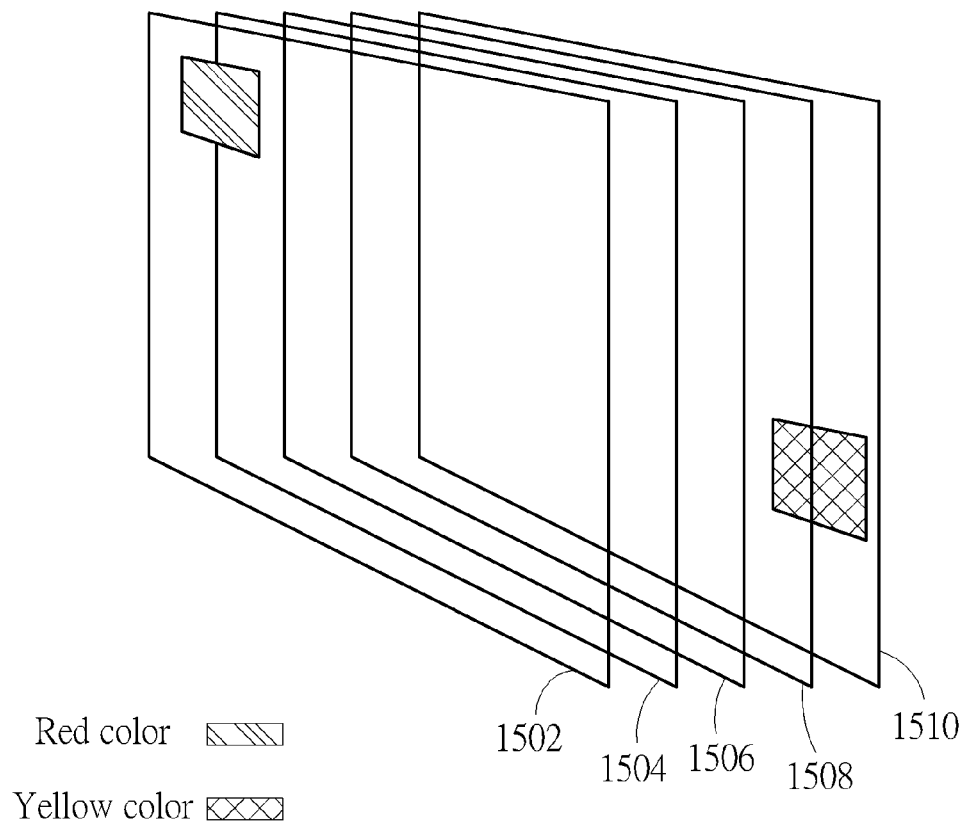
FIG. 15 is a diagram illustrating 5 stacked transparent display panels.
Figure 16:
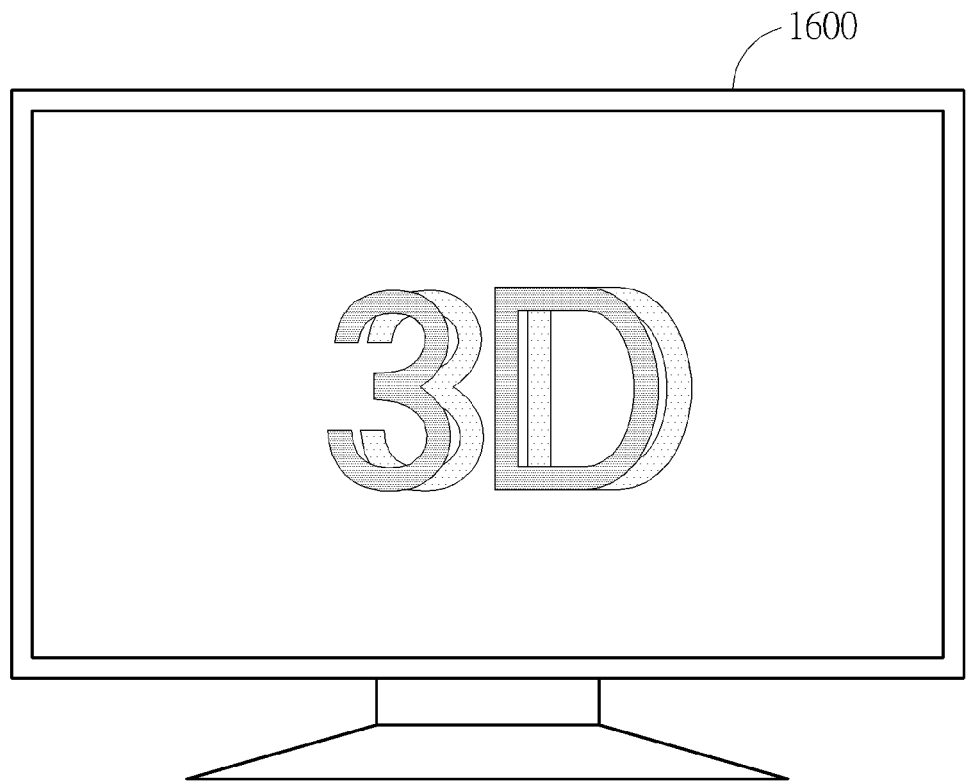
FIG. 16 is a diagram illustrating a three-dimensional display panel.

Please refer to FIG. 13 to FIG. 16. FIG. 13 is a flowchart illustrating a calibration method of an image capture system according to another embodiment, FIG. 14 is a diagram illustrating 5 test patterns 1402, 1404, 1406, 1408, 1410, FIG. 15 is a diagram illustrating 5 stacked transparent display panels 1502, 1504, 1506, 1508, 1510, and FIG. 16 is a diagram illustrating a three-dimensional display panel 1600. The calibration method in FIG. 13 is illustrated using the image capture device 100 of FIG. 1A, the device 110, the 5 test patterns 1402, 1404, 1406, 1408, 1410 of FIG. 14, the 5 stacked transparent display panels 1502, 1504, 1506, 1508, 1510 of FIG. 15, and the three-dimensional display panel 1600 of FIG. 16. Detailed steps are as follows:

Step 1300: Start.

Step 1302: The image capture device 100 captures a corresponding image including a plurality of intersection coordinates among a plurality of geometric blocks of each test pattern of a plurality of test patterns and a color information of each geometric block of the plurality of geometric blocks of the each test pattern of the plurality of test patterns.

Step 1304: The operation unit 1104 executes a first operation on a plurality of intersection coordinates among a plurality of geometric blocks included in each corresponding image to generate a plurality of geometric calibration parameters.

Step 1306: The operation unit 1104 executes a second operation on a color information of each geometric block of a plurality of geometric blocks included in each corresponding image to generate a plurality of color calibration parameters.

Step 1308: The calibration unit 1102 calibrates the image capture device 100 according to the plurality of geometric calibration parameters and the plurality of color calibration parameters.

Step 1310: End.

Take FIG. 14 as an example. Each test pattern of the 5 test patterns 1402, 1404, 1406, 1408, 1410 is located on a corresponding plane, and a relative angle exists between each corresponding plane and the image capture device 100. Therefore, the image capture device 100 captures a corresponding image including a plurality of intersection coordinates among a plurality of geometric blocks of each test pattern of the 5 test patterns 1402, 1404, 1406, 1408, 1410 and a color information of each geometric block of the plurality of geometric blocks of the each of test pattern of the 5 test patterns 1402, 1404, 1406, 1408, 1410. Because each of test pattern of the 5 test patterns 1402, 1404, 1406, 1408, 1410 is located on a corresponding plane and a relative angle exists between each corresponding plane and the image capture device 100, an image corresponding to each test pattern of the 5 test patterns 1402, 1404, 1406, 1408, 1410 corresponds to a relative angle. Therefore, in Step 1304 and Step 1306, the operation unit 1104 can generate much location information or color information to get more accurate geometric calibration parameters and more accurate color calibration parameters according to an image corresponding to each test pattern of the 5 test patterns 1402, 1404, 1406, 1408, 1410. In Step 1308, the calibration unit 1102 can calibrate the image capture device 100 according to the more accurate geometric calibration parameters and the more accurate color calibration parameters to increase accuracy of geometric calibration and color calibration of the image capture device 100. In addition, the present invention is not limited to the 5 test patterns 1402, 1404, 1406, 1408, 1410 shown in FIG. 14. That is to say, FIG. 14 can include a plurality of test patterns, each test pattern of the plurality of test patterns is located on a corresponding plane, and a relative angle exists between the corresponding plane and the image capture device 100.

Take FIG. 15 as an example. Each test pattern of the plurality of test patterns is generated by display patterns displayed on the 5 stacked transparent display panels 1502, 1504, 1506, 1508, 1510 (wherein each display pattern is displayed on one of transparent display panels 1502, 1504, 1506, 1508, 1510 corresponding to an exclusive depth), wherein each transparent display panel of the 5 stacked transparent display panels 1502, 1504, 1506, 1508, 1510 is parallel to a lens plane of the image capture device 100, and the 5 stacked transparent display panels 1502, 1504, 1506, 1508, 1510 are stacked parallel to the lens plane of the image capture device 100. But, in another embodiment of the present invention, each transparent display panel of the 5 stacked transparent display panels 1502, 1504, 1506, 1508, 1510 is not perpendicular to the lens plane of the image capture device 100, and the 5 stacked transparent display panels 1502, 1504, 1506, 1508, 1510 are stacked not perpendicular to the lens plane of the image capture device 100. Because each test pattern of the plurality of test patterns is generated by the display patterns displayed on the 5 stacked transparent display panels 1502, 1504, 1506, 1508, 1510, a plurality of geometric blocks included in an image captured by each image capture device of the image capture system cannot overlap each other. Because each test pattern of the plurality of test patterns is generated by the display patterns displayed on the 5 stacked transparent display panels 1502, 1504, 1506, 1508, 1510, in Step 1304 and Step 1306, the operation unit 1104 can generate much location information or color information to get more accurate geometric calibration parameters and more accurate color calibration parameters according to an image corresponding to each test pattern of the plurality of test patterns. In Step 1308, the calibration unit 1102 can calibrate the image capture device 100 according to the more accurate geometric calibration parameters and the more accurate color calibration parameters to increase accuracy of geometric calibration and color calibration image capture device 100.

Take FIG. 16 as an example. Each test pattern of the plurality of test patterns is generated by the three-dimensional display panel 1600, wherein the image capture device 100 can capture a different test pattern at a different view angle. For example, as shown in FIG. 16, images (corresponding to a test pattern "3D" displayed on the three-dimensional display panel 1600) captured by the image capture device 100 at different view angles are different from each other. Because images (corresponding to each test pattern displayed on the three-dimensional display panel 1600) captured by the image capture device 100 at different view angles are different from each other, in Step 1304 and Step 1306, the operation unit 1104 can generate much location information or color information to get more accurate geometric calibration parameters and color calibration parameters according to an image corresponding to each test pattern of the plurality of test patterns. In Step 1308, the calibration unit 1102 can calibrate the image capture device 100 according to the more accurate geometric calibration parameters and the more accurate color calibration parameters to increase accuracy of geometric calibration and color calibration of the image capture device 100.

To sum up, the calibration method of an image capture system utilizes the test pattern or the test patterns provided by the present invention to simultaneously execute geometric calibration and color calibration, or simultaneously execute geometric calibration, color calibration, and lens shading calibration. In addition, the present invention generates images (including the test pattern or the test patterns) corresponding to different relative angles through the mechanical apparatus, the test patterns located on different planes, the plurality of stacked transparent display panel, or the three-dimensional display panel. Therefore, compared to the prior art, the present invention not only can save a lot of cost and time, but can also increase calibration accuracy of the image capture device because the present invention can generate more accurate calibration parameters.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method of an image capture system, wherein the image capture system comprises at least one image capture device and a calibration unit, a device applied to the calibration method comprises an operation unit, a test pattern comprises a plurality of geometric blocks, and each geometric block of the plurality of geometric blocks has at least two sides and comprises one color, wherein colors of two adjacent geometric blocks of the plurality of geometric blocks are different, and two geometric blocks of the plurality of geometric blocks are not overlapped, the calibration method comprising:

an image capture device of the at least one image capture device capturing an image comprising a plurality of intersection coordinates among the plurality of geometric blocks of the test pattern and a color information of the each geometric block of the plurality of geometric blocks of the test pattern;

the operation unit executing a first operation on a plurality of intersection coordinates comprised in the image to generate a plurality of geometric calibration parameters;

the operation unit executing a second operation on a color information corresponding to an interested area of each geometric block of a plurality of geometric blocks comprised in the image to simultaneously generate a plurality of color calibration parameters for different colors of the plurality of geometric blocks comprised in the image only through the test pattern; and the calibration unit executing geometric calibration and color calibration on the image capture device according to the plurality of geometric calibration parameters and the plurality of color calibration parameters corresponding to the test pattern together.

2. The calibration method of claim 1, wherein a color of the each geometric block of the plurality of geometric blocks is different from a color of a substrate supporting the test pattern and is used for defining a profile of the each geometric block of the plurality of geometric blocks, wherein the color of the each geometric block is a uniform color or a gradient color.

3. The calibration method of claim 1, wherein the first operation is a linear regression calculation.

4. The calibration method of claim 1, wherein the second operation is a linear regression calculation.

5. The calibration method of claim 1, wherein the each geometric block of the plurality of geometric blocks comprises a uniform color area, and colors of uniform color areas comprised in the plurality of geometric blocks are identical each other.

6. The calibration method of claim 5, wherein a color of the uniform color area is different from a color of the each geometric block.

7. The calibration method of claim 5, wherein a color of the uniform color area is a white color.

8. The calibration method of claim 5, further comprising:

the operation unit executing a third operation on the uniform color area comprised in the each geometric block of the plurality of geometric blocks comprised in the image to generate a lens shading parameter; and the calibration unit calibrating the image capture device according to the lens shading parameter.

* * * * *